United States Patent

[11] 3,623,618

[72] Inventor Stanley B. Shaw
 Sunol, Calif.
[21] Appl. No. 867,776
[22] Filed Oct. 20, 1969
[45] Patented Nov. 30, 1971
[73] Assignee C T Supply Co.
 Fremont, Calif.

[54] PALLET STORAGE AND DELIVERY MECHANISM
 9 Claims, 5 Drawing Figs.
[52] U.S. Cl. .................................................. 214/8.5 K,
 221/297
[51] Int. Cl. ....................................................... B65g 59/06
[50] Field of Search ........................................... 214/8.5 A,
 8.5 K, 8.5 R; 221/277, 297

[56] References Cited
 UNITED STATES PATENTS
 1,095,319 5/1914 Erwin .......................... 214/8.5 K UX
 1,907,713 5/1933 Bnson .......................... 214/8.5 K UX
 2,279,420 4/1942 Thum .......................... 214/8.5 K X
 2,330,229 9/1943 Maher .......................... 214/8.5 K UX
 3,478,899 11/1969 Pitchford ...................... 214/8.5 A Primary Examiner—Gerald M. Forlenza
Assistant Examiner—George F. Abraham
Attorney—Joseph B. Gardner ABSTRACT: A downstacker mechanism for storing and delivering pallets one by one to a conveyor for transport thereby to a palletizer machine operative to assemble for packaging empty containers of the type commonly known as cans or tin cans. The mechanism includes a vertically oriented storage magazine in which pallets are retained in stacked juxtaposition one above another. Associated with the storage magazine are a plurality of pallet-support and delivery devices mounted for rotational movement about horizontal axes, and each having a plurality of outwardly extending fingers angularly spaced from each other for selective engagement with pallets comprising such stack thereof so as to control movement of the stack through the magazine. Motor means drivingly connected with the devices synchronously displaces the same step by step so as to cause the same to release in turn each successive lowermost pallet in the stack upon demand from a discharge conveyor onto which such pallets are delivered.

INVENTOR
STANLEY B. SHAW
By Joseph B. Gardner
ATTORNEY

PALLET STORAGE AND DELIVERY MECHANISM

This invention relates to storage and delivery mechanism and, more particularly, to a downstacker mechanism operative to store pallets in stacked juxtaposition within a magazine therefor and to deliver each successive lowermost pallet in such stack to a discharge conveyor located therebelow.

In factories in which metal containers of the type used for packaging food products and the like for retail sale (which containers are commonly referred to as cans or tin cans) are made, it is customary to close the container only at one end leaving the other end open to enable the container to be filled with the product to be sold therein. Since the open containers may not be immediately used, and are not necessarily used at the place of their fabrication, they are ordinarily assembled into large packages for shipment and storage, and such assembly and packaging is effected for the most part by machinery called palletizers.

The name palletizer is generally descriptive of the function performed by such machinery in that the purpose thereof is to assemble a mass of containers delivered thereto into ordered rows upon a support or base known as a pallet. Such pallets are relatively large although the precise size thereof will depend upon the particular containers to be supported thereon. By way of example, a typical pallet may have a size of the order of 4 by 5 feet so as to accommodate 12 to 14 longitudinally and transversely oriented rows of containers arranged in layers one upon another constituting, perhaps, 10 layers in height. Such pallets are delivered to the palletizer at the rate required for use thereat, and it is common to supply pallets by means of mechanism referred to as a downstacker, and which is operative to deliver pallets one by one to a conveyor that transports the same to the palletizer machinery. The downstackers now in use are exceedingly complex and expensive, and are difficult to clear when a broken pallet is located therein.

A general object of the present invention is to provide an improved downstacker or pallet-storage and -delivery mechanism not having the disadvantages or limitations of the mechanisms now in use. Other objects of more particular reference include the provision of an improved downstacker mechanism that is structurally simple and functionally reliable; that delivers pallets one by one from a stack thereof contained within a storage magazine upon demand from a discharge conveyor; that enables broken pallets to be removed from the mechanism quickly and easily and without the need to completely unload the storage magazine; that delivers such pallets by means of a single rotational motion, thereby obviating the requirement for complex apparatus and motions; and that derives its movements directly from mechanical means, thereby eliminating the need for hydraulic circuitry, reciprocatory elevator and support structures, and cooperative interaction between such support and elevator structures.

Additional objects and advantages of the invention, especially as concerns particular features and characteristics thereof, will become apparent as the specification develops.

An embodiment of the invention is illustrated in the accompanying drawings in which.

Figures 4, 5:
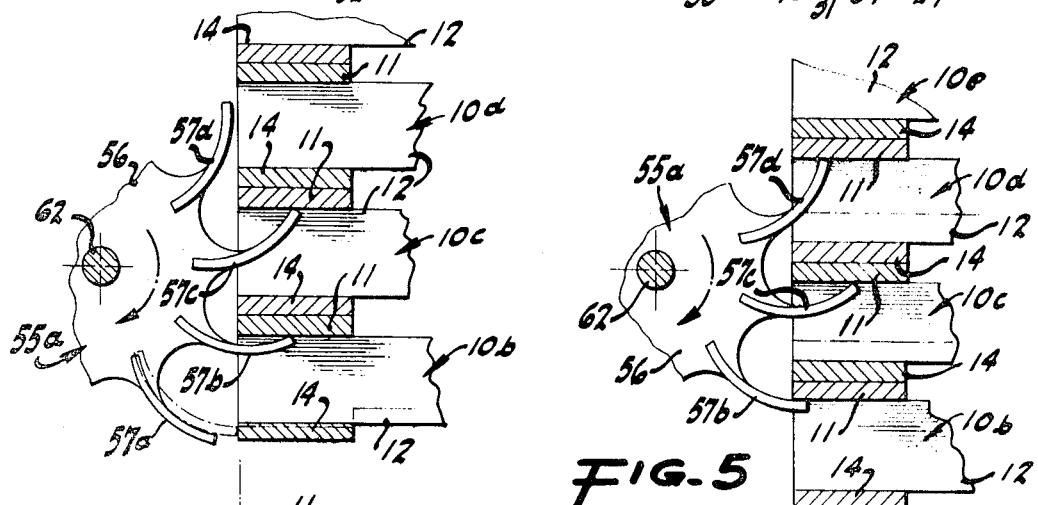

FIG. 4 is an enlarged, broken vertical sectional view showing a stack of pallets carried by the support and delivery devices and one pallet in position on the discharge conveyor after release by such devices; and FIG. 5 is an enlarged, broken vertical sectional view similar to that of FIG. 4 but illustrating one of the delivery devices in the process of lowering the stack of pallets and releasing the lowermost pallet in such stack thereof.

The pallet storage and delivery mechanism embodying the present invention is especially suited for use with pallets of the type used in the assembly and packaging of metal containers of the type in which food products and other commodities are sold through retail outlets, and which containers are often referred to as cans or tin cans. As a typical example, such pallet may support 10 layers of containers thereon one above another with each layer comprising 12 transversely extending rows and 14 longitudinally extending rows of number 2 ½cans (i.e., cans having a diameter of approximately 4 1/16 inches and a height of about 4 11/16 inches). Such pallets are usually formed of wood and comprise discontinuous top and bottom surfaces spaced apart and interconnected by a plurality of transversely extending, longitudinally spaced ribs or joists. In the drawings, each such pallet is denoted in its entirety with the numeral 10 (letter suffixes being attached to differentiate the various pallets wherever it is helpful or desirable to do so) and comparing FIGS. 1 and 3 it will be observed that the top wall of each pallet 10 is formed by a plurality of longitudinally extending, transversely spaced strips 11 disposed in substantially parallel relation and nailed or otherwise fixedly secured to a plurality of transversely extending, longitudinally spaced ribs or joists 12. The bottom wall of each pallet 10 is similarly formed by a plurality of longitudinally extending, transversely spaced strips 14 fixedly secured to the joists 12 and disposed in substantially parallel relation respectively underlying the strips 11, as illustrated. As respects the present invention, the pallets 10 may be conventional and per se form no part of the present invention, and in the customary manner, the joists 12 are transversely oriented so that the space between the superposed strips 11 and 14 along each longitudinal edge of a pallet is open.

Figure 1:
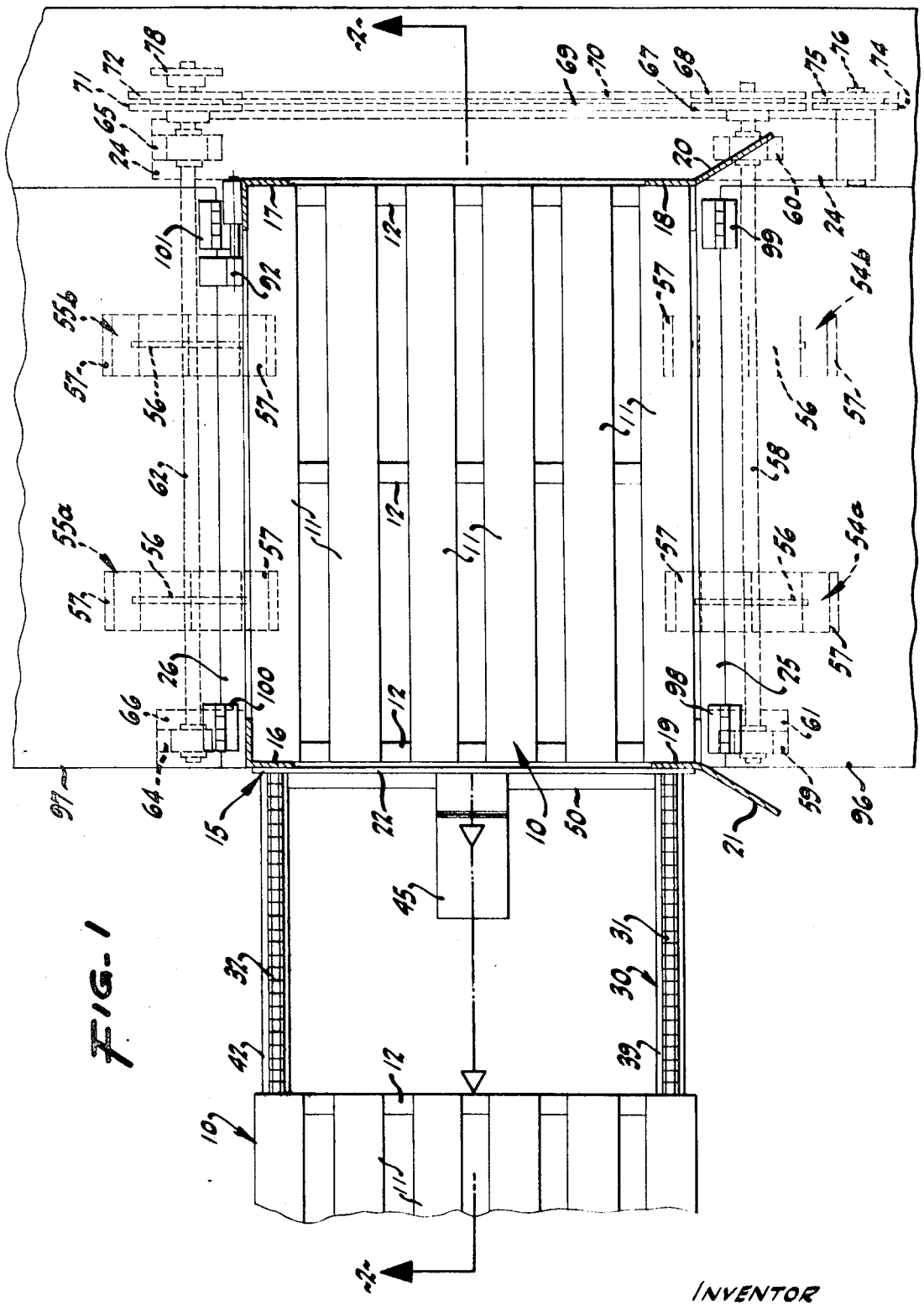
FIG. 1 is a broken plan view illustrating a downstacker mechanism embodying the invention.
Figure 2:
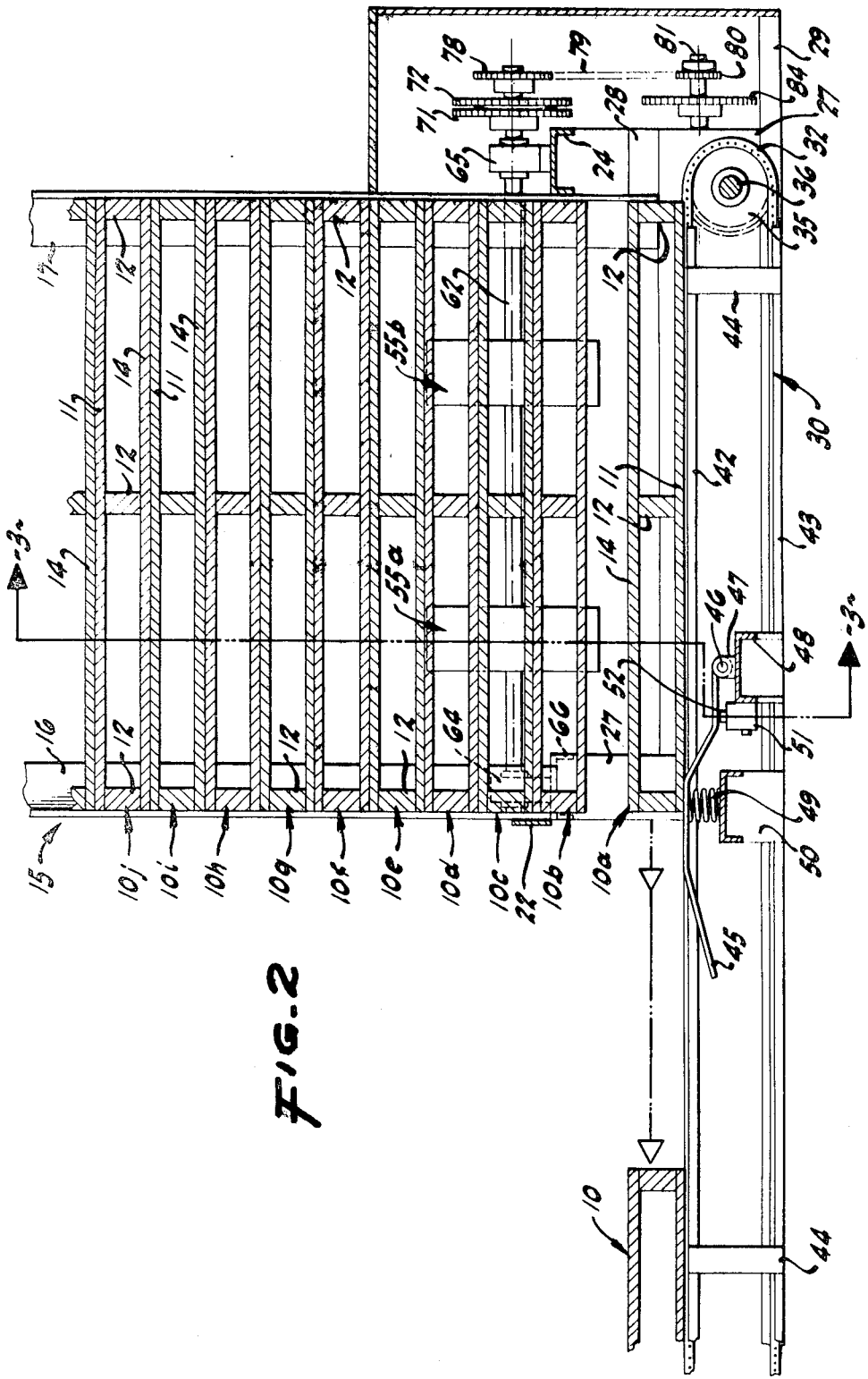
FIG. 2 is a broken vertical sectional view taken along the line 2—2 of FIG. 1.
Figure 3:
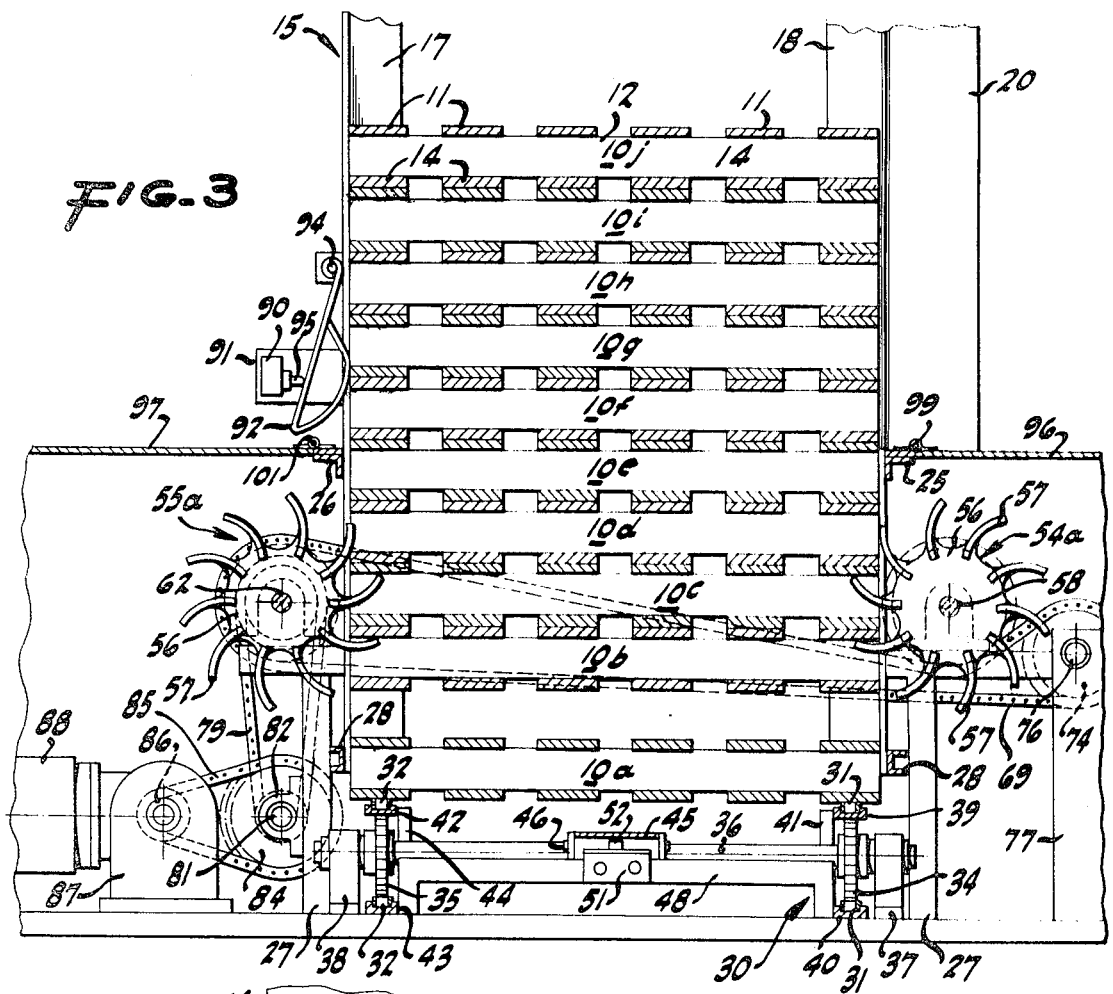
FIG. 3 is a broken vertical sectional view taken along the line 3—3 of FIG. 2.

As is most evident in FIGS. 2 and 3, the pallets 10 are oriented one above another in stacked juxtaposition within a magazine generally denoted with the numeral 15. The magazine 15 is vertically disposed and comprises a plurality of vertically oriented columns 16, 17, 18 and 19 respectively located at the corners of the magazine and defining the marginal edges thereof. The pallets 10 have a rectangular configuration and the magazine 15 is also rectangular, as is most evident in FIG. 1, and is dimensioned to receive the pallet therein with sufficient clearance being afforded to assure free vertical movement of each pallet through the magazine.

The columns 16 and 17 are generally L-shaped channels through out their lengths, but the columns 18 and 19 are generally L-shaped channels only throughout the lower portions thereof as is best shown in FIG. 1. Throughout most of their vertical extent, each of the columns 18 and 19 is turned outwardly so as to respectively form entrance guides or flanges 20 and 21 defining an inwardly converging mouth therebetween providing an entrance opening into the magazine 15 through which stacked pallets 10 are delivered thereto. The columns 16, 17, 18 and 19 are interconnected, as necessary, by horizontally disposed reinforcing components such as the strap 22 shown in FIGS. 1 and 2 along one side of the magazine, an inverted generally U-shaped channel 24 along the opposite side thereof, and a pair of L-shaped support channels 25 and 26 (FIG. 3) respectively disposed on the alternate opposite sides of the magazine.

Adjacent their lower ends, the columns 16, 17, 18 and 19 are fixedly secured to frame structure best shown in FIG. 2, and for identification, certain of the frame components are denoted with the numerals 27 and 28. The frame members 28 may be fixedly secured to a base plate 29 as illustrated in FIGS. 2 and 3. The described components of the magazine 15 may be formed of a metal such as steel, and the various components of the magazine may be interconnected one with another by means of welding or other conventional faster techniques.

The magazine 15 at its lower end is open, and pallets 10 are delivered one by one through such open end onto a discharge conveyor generally denoted with the numeral 30. The conveyor 30 includes a pair of transversely spaced and longitudinally disposed conveyor chains 31 and 32 that are endless and are respectively entrained at their opposite ends about sprockets therefor two of which are shown in FIG. 3 and are respectively denoted with the numerals 34 and 35. It will be appreciated that the conveyor chains 31 and 32 must be positively driven so as to move from right to left along their upper reaches in the direction of the arrows shown in FIG. 2. Drive means for the conveyor is not shown in the drawings since conventional and forming no part of the invention, and the sprockets 34 and 35 may be taken to be idler sprockets mounted upon a transversely extending shaft 36 journaled for rotation at the opposite ends thereon in bearings 37 and 38 each of which is mounted upon the base plate 29. The chain 31 is guided for movement in U-shaped tracks 39 and 40 interconnected at spaced-apart intervals by a plurality of struts 41 and attached to the base plate 29 so to be rigidly related thereto. Similarly, the chain 32 is guided for movement in U-shaped tracks 42 and 43 interconnected by a plurality of struts 44 and also fixedly secured to the base plate 29.

The conveyor 30 is adapted to be intermittently operated by control means, not shown, which may be manually energized or automatically actuated on demand from the palletizer machinery with which the pallet-storage and -delivery mechanism is used. However, pallets 10 are delivered automatically to the conveyor 30 from the storage magazine 15 whenever the end portion of the conveyor underlying the magazine is empty and thereby has need for a pallet thereon. In the accomplishment of such automatic pallet delivery by the mechanism, a sensor is associated with the conveyor 30, as shown best in FIG. 2, and such sensor includes an elongated tongue or feeler 45 extending longitudinally of the conveyor intermediate the chains 31 and 32 adjacent the delivery edge of the magazine 15 defined by the columns 16 and 19. The tongue 45 is pivotally supported adjacent one end thereof on a pin 46 supported by bracket structure 47 welded or otherwise attached to a generally U-shaped support bracket 48 extending transversely of the conveyor 30 (FIG. 3). The tongue 45 is biased upwardly in a clockwise direction as viewed in FIG. 2 by a helical compression spring 49 seating at its upper end against the tongue 45 and at its lower end against a U-shaped support channel 50 extending transversely of the conveyor 30 adjacent the columns 16 and 19 as is evident in both FIGS. 1 and 2.

The tongue 45 is operative to energize a switch 51 mounted upon the U-shaped support bracket 48 and having a plunger 52 projecting upwardly for engagement with the tongue 45. The tongue is adapted to abut any pallet 10 supported upon the conveyor chains 31 and 32 in underlying relation with the magazine 15, and the weight of such pallet pivots the tongue 45 downwardly in a counterclockwise direction as viewed in FIG. 2 against the biasing force of the spring 49 so as to depress the switch plunger 52. Whenever the conveyor 30 is energized so that the chains 31 and 32 thereof transport a pallet 10 from beneath the magazine 15, the spring 49 urges the tongue 45 upwardly whereupon the plunger 52 of the switch 51 returns to its extended positions which energizes drive means associated with delivery devices 54 and 55, as will be described in detail hereinafter, to cause the next successive pallet in the stack thereof to be dropped downwardly and onto the conveyor 30.

Associated with the magazine 15 and comprising a part of the the pallet-storage and -delivery mechanism are a plurality of support and delivery devices disposed along the respective longitudinal edges of the conveyor 15, as shown in FIGS. 1 and 3. In the particular embodiment of the invention being considered, there are 4 such devices arranged in pairs respectively disposed along such longitudinal edges. For identification the devices disposed along the entrance to the magazine defined by the outwardly diverging guides or flanges 20 and 21 are denoted with the numerals 54a and 54b, and those along the opposite side of the magazine are denoted with the numerals 55a and 55b. It should be observed that the two devices 54 are identical as are the two devices 55, and the devices 54 and 55 are identical except for their orientation which is reversed relative to each other, as shown best in FIG. 3.

Comparing FIGS. 1 and 3, it will be apparent that each of the devices 54 and 55 comprises a wheel or hub 56 that is relatively flat and has a platelike configuration. Extending outwardly from each plate 56 are a plurality of angularly spaced fingers 57 having a somewhat arcuate configuration, as shown best in FIGS. 3, 4 and 5, curved such that the outer free ends thereof trail the inner ends relative to the direction of rotation of the devices. The fingers 57 are angularly spaced from each other by a distance essentially equivalent to the center to center spacing between successive pallets 10 in the stack thereof contained within the magazine 15. Such spacing between the fingers 57 enables them to engage and support successive pallets 10 within the magazine 15 so as to lower the pallets one by one onto the discharge conveyor 30 as will be explained more completely hereinafter.

The fingers 57 are of greater width than the wheels 56 and extend outwardly from each side thereof as best shown in FIG. 1. Such width of the fingers enables them to engage a pallet 10 throughout a substantial extent and thereby enlarge the effective support area over which the weight of a pallet and stack thereabove is supported. The two wheels 56 respectively provided by the devices 54a and 54b are mounted in longitudinally spaced relation upon a horizontal shaft 58 journaled for rotation adjacent the opposite ends thereof in bearing structures 59 and 60 the first of which is mounted upon a bracket 61 rigidly attached to the magazine column 19, and the second of which is supported upon the U-shaped channel 24. In a completely analogous manner, the wheels 56 respectively defined by the devices 55a and 55b are mounted upon a horizontal shaft 62 in longitudinally spaced relation therealong, and the shaft is journaled for rotation in bearings 64 and 65 the first of which is mounted upon a bracket 66 secured to the magazine column 16 and the second of which is mounted upon the channel 24.

The shafts 58 and 62 extend beyond the respectively associated bearing structures 60 and 65 and are arranged thereat with drive means for rotating the shafts and support and delivery devices 54 and 55 mounted thereon in mechanically enforced synchronism so as to displace the same step by step in opposite angular directions to release each successive lowermost pallet 10 in a stack thereof for delivery through the open bottom of the magazine 15 onto the underlying discharge conveyor 30. The drive train includes a pair of sprockets 67 and 68 mounted upon the shaft 58 in side-by-side relation as shown in FIG. 1, and engaging the respective sprockets are a pair of endless drive chains 69 and 70 which at one end are respectively entrained about a pair of sprockets 71 and 72 mounted upon the shaft 62 in side by side relation. The chains 69 and 70 pass under the sprockets 67 and 68 and are held in driving engagement therewith by a pair of idler sprockets 74 and 75 about which the chains are also entrained. The sprockets 74 and 75 are rotatably supported via a shaft 76 journaled for rotation in bearing structure carried by a vertical frame member 77 secured by a base plate 29, as shown in FIG. 3. The chains 69 and 70 as interconnected with the shafts 58 and 62 through the various sprockets 67, 68, 71, 72, 74 and 75 cause the shafts to rotate synchronously in opposite angular directions so that the shaft 58 rotates in a counterclockwise direction as viewed in FIG. 3 and the shaft 62 rotates in a clockwise direction as viewed in the same figure.

The shaft 62 also extends outwardly beyond the sprockets 71 and 72 and is equipped thereat with a sprocket 78 having an endless chain 79 entrained thereabout which at its opposite end is entrained about a much smaller drive sprocket 80 mounted upon a shaft 81 journaled for rotation in bearing structure 82 (FIG. 3) rigidly attached to the frame element 27 of the mechanism. Also mounted upon the shaft 81 is a larger sprocket 84 about which is entrained a drive chain 85 that drivingly engages the output sprockets 86 of a gear reducer 87 the driving input of which is supplied by an electric motor 88. The motor 88 is a conventional reversible gear head motor equipped with the aforementioned gear reducer 87, and it has a relatively high starting torque which may be of the order of 3,000 pounds. In a typical embodiment of the invention a one-half-horsepower motor is used having a shaft velocity of 1,720 r.p.m. reduced to about 16.5 r.p.m. at the gear reducer 87 and further reduced to about 5 r.p.m. at the shafts 58 and 62.

The energizing circuit (not shown) for the motor 88 includes the aforementioned switch 51 arranged such that the control circuit is open whenever the pallet 10 is supported upon the conveyor 30 in underlying relation with the magazine 15, as shown in FIG. 2. When such pallet 10 is removed by the conveyor 30 so that the sensing tongue 45 can spring upwardly, the switch 51 then closes the energizing circuit for the motor 88 whereupon it becomes operative and remains so until the switch is returned to its initial position by a descending pallet. The inertia of the motor 88 together with the drive ratio defined by the gear reducer 87 in combination with the sprockets 86, 84, 80 and 78 is such that the devices 54 and 55 are displaced angularly through one step, with no override (i.e., immediate stoppage of the motor when the switch 51 is triggered by a descending pallet), the angular distance of which is equivalent to the center to center spacing between successive pallets 10 supported within the magazine 15.

This is best seen by comparing FIGS. 4 and 5 the first of which shows the mechanism in a condition of rest with a pallet 10a supported upon the chains of the conveyor 30. In this condition of the mechanism, the entire stack of pallets within the magazine 15 is supported by the devices 54 and 55, for convenience of description the respective pallets in such stack thereof are denoted in vertical ascendency with the numerals 10b, 10c, 10d and 10e. The device 55a is in an angular orientation such that the finger 57a thereof has released the pallet 10a which has dropped downwardly onto the conveyor 30. The next successive pallet 10b is supported by the following finger 57b of the device 55a, and the finger is located within the interior of the pallet in underlying relation with the outer upper strip 11 thereof. At the same time the next adjacent finger 57c of the device 55a is within the interior of the next pallet 10c in the stack thereof and is engaging the strip 11 of such pallet. The next successive finger 57d has not as yet entered the interior of the pallet 10d so that the entire stack of pallets is effectively supported by two fingers 57b and 57c of each of the devices 54 and 55.

When the conveyor 30 removes the pallet 10a from beneath the magazine 15, the sensor tongue 45 causes the switch 51 to energize the motor 88 and the device 55a is then displaced angularly in a clockwise direction, as shown by the arrows in FIGS. 4 and 5, with the result that the entire stack of pallets commences to be lowered. As part of such lowering or downstacking operation, the next finger 57d of the device 55a enters the pallet 10d so as to engage the under surface of the outer strip 11 thereof. Continued angular displacement of the device 55a tends to withdraw the finger 57b thereof from the pallet 10b (compare FIGS. 4 and 5), and when the finger is completely withdrawn from such lowermost pallet the pallet drops because of its own weight onto the underlying conveyor 30. The finger 57b then has the position of the finger 57a as it is shown in FIG. 4, and the pallet 10c is then the lowermost pallet in the stack thereof. The mechanism will remain in this latter condition until the pallet 10b is removed by the conveyor 30, whereupon the switch 51 will be actuated to energize the next cycle of operation.

As pallets are removed one by one from the magazine 15, it is apparent that the supply of pallets 10 therein will become depleted and additional pallets must be supplied thereto. In the usual instance, the pallets are placed within the magazine 15 manually in the sense that the magazine is loaded from time to time by means of a forklift truck or similar mechanism. Advantageously, signal means are employed to alert appropriate personnel as to when the supply of pallets within the magazine needs to be replenished, and such signal means may take any appropriate form and can visual, audible, or combinations thereof. In the particular mechanism being considered such signal means includes a switch 90 supported by a L-shaped bracket 91 secured to the magazine 15 at any appropriate location thereon. The switch 90 is actuated by a sensing arm or element 92 pivotally supported at one end, as shown at 94, so as to swing inwardly into the interior of the magazine 15 and be engaged by pallets 10 moving downwardly therethrough.

When an adequate supply of pallets 10 are within the magazine 15, as shown in FIG. 3, the pallets maintain the arm 92 in an outer position in which it engages the plunger 95 of the switch 90 which maintains an associated signal device (not shown) in a deenergized condition. Whenever the supply of pallets decreases to an elevation below that of the arm 92, the arm swings inwardly because of its own weight, which may be augmented by a biasing spring (not shown), so as to actuate the switch 90 whereupon the signal device associated therewith is energized to alert appropriate personnel to the diminished level of the pallet and requirement for a new supply thereof within the magazine. In the embodiment of the mechanism shown, the switch 90 is actuated whenever the last pallet within the magazine 15 is at the elevation of the pallet 10f and then descends to the next successive lower elevation which in FIG. 3 is the elevation of the pallet 10e.

The elevation of the pallet 10e is approximately the same as that of a pair of horizontally disposed cover plates 96 and 97 that respectively cover the devices 54 and 55 to enclose the same. The cover plate 96 is adjacent the mouth of the magazine formed by the outwardly diverging flanges 20 and 21 so that pallets supplied to the magazine are advanced thereinto over the cover plate 96. Thus, the plate 96 effectively forms a guide for the operator of any such forklift truck supplying pallets to the magazine, and to release a stack of pallets after advancing the same into the magazine, the lift of such truck is moved downwardly until the slats or strips 14 of the lowermost pallet being carried by truck fork rest upon the upper slats or strips 11 of the uppermost pallet then within the magazine. The plates 96 and 97 are pivotally supported adjacent their transverse edges by hinge structures 98, 99 and 100, 101 which are respectively secured to the aforementioned L-shaped channels 25 and 26 shown in FIGS. 1 and 3. Thus, the cover plates can be swung upwardly to provide access to the devices 54 and 55 when necessary.

Occasionally a broken or otherwise damaged pallet 10 is inadvertently placed within the magazine 15 and remains undetected therein until it interferes with normal operation of the delivery devices 54 and 55. Should such malfunction occur, the operator of the mechanism simply energizes the motor 88 in a reverse direction by manual control means (not shown) to return the broken pallet to an elevation generally corresponding to that of the pallet 10e shown in FIG. 3. The operator can then raise all of the pallets stacked thereabove, as by means of the forklift truck, and the broken pallet is then readily removed. Thus, the occurrence of a broken pallet which otherwise could be difficult to remove is readily cleared from the mechanism.

As indicated hereinbefore, the downstacker or pallet-storage and -delivery mechanism is exceedingly simple requiring no hydraulic elevator mechanisms, circuitry, complex scissors mechanism and no multiplicity of cooperative support and lowering mechanisms necessitating timed interaction so as to support with one apparatus all but the lowermost pallet in a stack thereof while such lowermost pallet is being removed from the stack by a second apparatus, and then support the stack with such second apparatus while the first apparatus is indexed upwardly into cooperative engagement with the next successive pallet to condition the mechanism for another cycle of operation. Further, a single motion is all that is required of the movable components of the mechanism, and such motion is one of simple rotation always in the same direction except for any brief requirement of reverse rotation to remove a broken pallet, as herebefore explained.

While in the foregoing specification an embodiment of the invention has been described in considerable detail for purpose of making a complete disclosure thereof, it will be apparent to those skilled in the art that numerous changes may be made in such details without departing from the spirit and principles of the invention.

What is claimed is:

1. A pallet storage and delivery mechanism, comprising a vertically oriented storage magazine adapted to receive a plurality of pallets therein oriented one above another in stacked juxtaposition and having an open lower end through which pallets are delivered one by one, a pair of pallet-support and -delivery devices respectively disposed along opposite sides of said magazine and each including a wheel supported for rotation about a generally horizontal axis and a plurality of fingers extending outwardly from the wheel and angularly spaced from each other by distances essentially equivalent to the center to center spacing between successive pallets in such stack and respectively engageable therewith, drive means connected with said wheels for synchronously displacing the same step by step in opposite angular directions to release each successive lowermost pallet in a stack thereof for delivery through said open lower end of the magazine while at the same time supporting the next adjacent pallet and stack thereabove and indexing the same downwardly one step within said magazine, and control means for energizing said drive means in step by step relation, each of said fingers arcuate and curving rearwardly with respect to the direction of rotation of the associated wheel so that the free outer end of each finger trails the inner end thereof.

2. The mechanism of claim 1 and further comprising an additional pair of pallet-support and -delivery devices as aforesaid respectively disposed along the opposite sides of said magazine so that there are at least two devices on each of said opposite sides thereof.

3. The mechanism of claim 1 in which said drive means includes a reversible motor to enable said devices to be rotated in opposite angular directions to facilitate removal of broken pallets from said magazine.

4. The mechanism of claim 1 and further comprising a pallet-supply sensor including a switch and actuator therefor disposed along said magazine so as to sense the minimum elevation of any stack of pallets therein.

5. The mechanism of claim 1 and further comprising a discharge conveyor passing beneath said magazine so as to receive pallets delivered through said open lower end thereof, and in which said control means includes a demand sensor positioned along said discharge conveyor to determine the presence and absence of a pallet thereon beneath said magazine and energize said drive means in response to the absence of a pallet thereat.

6. The mechanism of claim 5 and further comprising an additional pair of pallet-support and -delivery devices as aforesaid respectively disposed along the opposite sides of said magazine so that there are at least two devices on each of said opposite sides thereof, and in which said drive means includes a reversible motor to enable said devices to be rotated in opposite angular direction to facilitate removal of broken pallets from said magazine.

7. The mechanism of claim 5 and further comprising a pallet-supply sensor including a switch and actuator therefor disposed along said magazine so as to sense the minimum elevation of any stack of pallets therein.

8. In a pallet storage and delivery mechanism, an upwardly extending storage magazine adapted to receive a plurality of pallets therein oriented one above another in stacked juxtaposition and having an open lower end through which pallets are delivered one after another, a pallet-support and -delivery device disposed along a side of said magazine and including a wheel supported for rotation about a generally horizontal axis and a plurality of fingers extending outwardly from the wheel and angularly spaced from each other so as to be respectively engageable with successive lowermost pallets in such stack, and drive means connected with said wheel for angularly displacing the same to release from a finger engaging the same each successive lowermost pallet in a stack thereof for delivery through said open lower end of the magazine, each of said fingers being arcuate and curving rearwardly with respect to the direction of rotation of said wheel so that the free outer end of each finger trails the inner end thereof.

9. The mechanism of claim 8 in which said fingers are angularly spaced from each other by distances essentially equivalent to the center to center spacing between successive pallets in such stacks and are respectively engageable therewith so that as each lowermost pallet in a stack is released by one finger, the next adjacent pallet and stack thereabove are supported by another finger.

* * * * *